United States Patent
Kollmeyer et al.

[11] 3,892,724
[45] July 1, 1975

[54] 1-(PHENYLAZO OR SUBSTITUTED PHENYLAZO)-2-IMIDAZOLIDINONES

[75] Inventors: Willy D. Kollmeyer; Samuel B. Soloway, Modesto, both of Calif.

[73] Assignee: Shell Oil Company, Houston, Tex.

[22] Filed: Jan. 26, 1973

[21] Appl. No.: 326,734

[52] U.S. Cl. ............... 260/140; 71/92; 260/309.7; 260/647
[51] Int. Cl.[2] ................ A01N 9/22; C07C 115/00
[58] Field of Search .................... 260/140; 71/92

[56] References Cited
UNITED STATES PATENTS

| | | | |
|---|---|---|---|
| 3,206,357 | 9/1965 | Cannon et al. | 260/140 X |
| 3,382,061 | 5/1968 | Bondarenko et al. | 260/140 X |
| 3,526,479 | 9/1970 | Rey | 260/140 X |
| 3,660,373 | 5/1972 | Roueche | 260/140 X |

*Primary Examiner*—Floyd D. Higel

[57] ABSTRACT

1-(Phenylazo-2-imidazolidinones of the formula

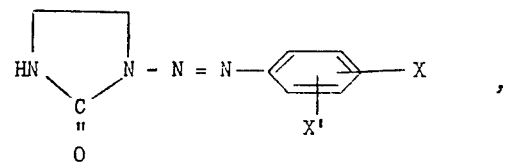

1-amino-2-imidazolidinone where X and X' are independently hydrogen, halogen, nitro or —(Y)$_p$—alkyl wherein the alkyl portion contains 1 to 4 carbon atoms optionally substituted by one or more halogen atoms, Y is oxygen or sulfur and $p$ is 0 or 1, useful as herbicides, are prepared by intimately admixing and thereby effecting a reaction between 1-amino-2-imidazolidonone or a salt thereof and the corresponding nitrosophenyl compound in glacial acetic acid.

4 Claims, No Drawings

1-(PHENYLAZO OR SUBSTITUTED PHENYLAZO)-2-IMIDAZOLIDINONES

BACKGROUND OF THE INVENTION

1. Field of the Invention

This invention relates to new herbicides and to new herbicidal compositions containing said herbicides. More specifically this invention relates to a new class of compounds, namely 1-(phenylazo)-2-imidazolidinones and to a new method and composition for controlling undesirable plant growths using said 1-(phenylazo)-2-imidazolidinones.

SUMMARY OF THE INVENTION

The novel compounds of this invention are represented by the Formula

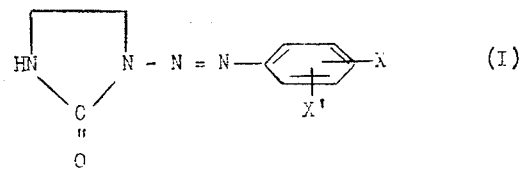

where X and X' are independently hydrogen, halogen, nitro or $-(Y)_p-$alkyl wherein the alkyl portion contains 1 to 4 carbon atoms optionally substituted by one or more halogen atoms, Y is oxygen or sulfur and $p$ is 0 or 1.

The novel compounds of Formula I are prepared by intimately admixing and thereby effecting a reaction between a compound of Formula II

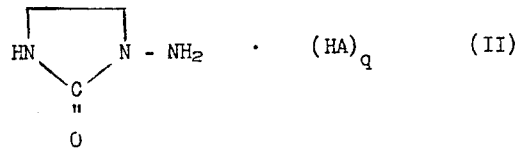

wherein HA represents a strong acid and $q$ is 0 or 1 and a compound of Formula III

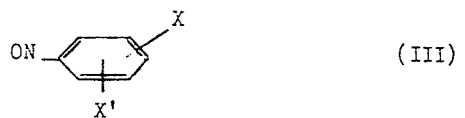

wherein X and X' are as defined above, in the presence of glacial acetic acid.

Herbicidal compositions of this invention comprise a compound of Formula I and an inert agriculturally acceptable carrier therefor. Undesirable plant growth is destroyed or prevented by applying the compounds of Formula I ordinarily in a herbicidal composition of one of the afore-mentioned types to either the unwanted vegetation itself or to the area to be kept free of such unwanted vegetation.

DETAILED DESCRIPTION OF THE INVENTION

Typical novel compounds of this invention are those of Formula I above wherein X and X' are independently hydrogen, halogen of atomic number 9 to 35 inclusive, that is fluorine, chlorine or bromine, nitro or $-Y_p-$alkyl wherein the alkyl portion contains 1 to 4 carbon atoms optionally substituted by one or more halogen atoms; Y is oxygen or sulfur, $p$ is 0 to 1. By alkyl is meant any straight or branched chain alkyl having 1 to 4 carbon atoms, for example, methyl, ethyl, isopropyl, tertiary-butyl and the like. When the alkyl group is substituted by one or more halogen atoms, typical substituents contemplated for use within the scope of this invention are: chloromethyl, 1-bromoethyl, trifluoromethyl and the like.

When $p$ is 1, typical substituents represented by $-Y_p-$alkyl include trifluoromethoxy, trifluoromethylthio, trichloromethoxy, isopropoxy, ethoxy, methylthio, and the like.

Typical compounds contemplated for use within the scope of this invention include: 1-(2,4-dichlorophenylazo)-2-imidazolidinone, 1-(3-chloro-4-fluorophenylazo)-2-imidazolidinone, 1-(2,6-dichlorophenylazo)-2-imidazolidinone, 1-(3,4-dichlorophenylazo)-2-imidazolidinone, 1-(3,5-dichlorophenylazo)-2-imidazolidinone, 1-(4-chloro-alpha,alpha,alphatrifluoro-3-tolylazo)-2-imidazolidinone, 1-(5-chloro-alpha,alpha,alphatrifluoro-3-tolylazo)-2-imidazolidinone, 1-(6-chloro-alpha,alpha,alphatrifluoro-3-tolylazo)-2-imidazolidinone, 1-(3-trifluoromethoxyphenylazo)-2-imidazolidinone, 1-(3-trifluoromethylthiophenylazo)-2-imidazolidinone.

Preferred because of especially effective herbicidal properties are those compounds of Formula I wherein X is hydrogen, chlorine, or $-Y_p-$alkyl wherein the alkyl portion contains 1 to 4 carbon atoms optionally substituted by one or more halogen atoms and $p$ is 0 and X' is hydrogen.

Particularly preferred compounds of this subclass are those compounds wherein X is trifluoromethyl.

The herbicidal compounds of Formula I are prepared by intimately admixing and thereby effecting a reaction between 1-amino-2-imidazolidinone or an acid salt thereof and a corresponding nitrosobenzene in the presence of glacial acetic acid. The nitrosobenzene compounds having the formula

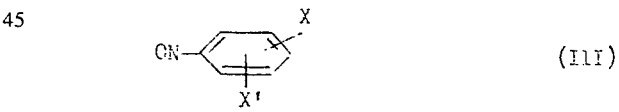

wherein X and X' are as defined above, can be conveniently prepared according to the method described by R. Holmes et al, *J. Org. Chem.*, 30, 3840 (1965). Using this method, for example, alpha,alpha,alphatrifluoro-3-nitrosotoluene is prepared from persulfuric acid and alpha,alpha,alpha-trifluoro-m-toluidine. For the purposes of the reaction contemplated for use within the scope of this invention either crude or purified material from their procedure may be used.

The reaction is preferably carried out in the absence of light and moisture. The reaction usually proceeds to completion in about 8 to 72 hours; however, variations in the particular reactants and the reaction conditions can lead to significant increases or decreases in the reaction rate.

If a salt of the 1-amino-2-imidazolidinone is used, the free amino compound is generated in situ by addition of an equivalent amount of base. Suitable bases contemplated for use within the scope of this invention are sodium acetate, sodium hydroxide, and the like.

Any suitable conventional method can be used to recover the 1-phenylazo-2-imidazolidinones of Formula I, for example, filtration, evaporation of the solvent, extraction of the product followed by distillation of the solvent and the like.

The 1-amino-2-imidazolidinone or an acid salt thereof is prepared by contacting an alcoholic solution of a compound of the Formula

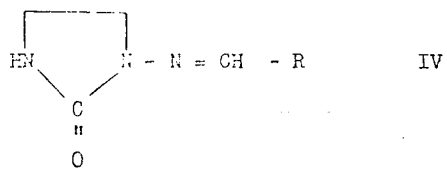

wherein R is aryl, with molecular hydrogen in the presence of a hydrogenation catalyst and a strong acid of the Formula HA.

By aryl is intended any aromatic hydrocarbyl radical. For ease of preparation aryl preferably represents an aromatic hydrocarbon radical having 6 to 10 carbon atoms such as phenyl or naphthyl.

The 1-aralkylideneamino-2-imidazolidinones of Formula IV are conveniently prepared according to the method of H. R. Snyder et al, *J. Med. Chem.*, 13, 756 (1970).

The alcohol solvent contemplated for use with this reaction is any aliphatic alcohol, for example, ethanol, methanol, isopropanol, and the like.

By hydrogenation catalyst is meant any hydrogenation catalyst commonly known in the art. Typical hydrogenation catalysts are palladium, platinum, nickel and the like. Suitably the hydrogenation catalyst is supported on a solid carrier, for example, powdered charcoal, and the like. For ease and convenience in carrying out the reaction, palladium on powdered charcoal is preferred.

The strong acid contemplated for use within the scope of this invention is any strong acid catalyst that will not poison the hydrogenation catalyst. Acids known in the art to poison the catalyst are sulfurous acid, or hydrofluoric acid, or hydrofluoroboric acid. Particularly preferred strong acids are hydrochloric acid, hydrobromic acid, trifluoroacetic acid, trichloroacetic acid, and the like.

The reaction is carried out at a pressure of 15 to 75 pounds per square inch and at a temperature of from 0° to 50°C. The time for the reaction to run to completion varies from about 10 minutes to 1 hour.

Compounds of this invention, for example, 1-(alpha,alpha,alphatrifluoro-3-tolylazo)-2-imidazolidinone have been found to be active herbicides. Certain members of the class are effective only against a limited number of plant species and are considered to be selective herbicides. Some of the compounds exhibit a high degree of herbicidal activity in the control of a variety of economically important species of grasses and broad leaf weeds. Some of the compounds are particularly useful as selective herbicides for use in certain important crops.

For use as herbicides, the compounds of this invention can be applied by conventional techniques, employing conventional formulations.

The method of applying the compositions of this invention comprises applying a 1-(phenylazo)-2-imidazolidinone of Formula I ordinarily in a herbicidal composition of one of the afore-mentioned types to a locus or area to be protected from undesirable plant growth. The active compound of course is applied in amounts sufficient to exert the desired herbicidal action.

The amount of the 1-(phenylazo)-2-imidazolidinone of Formula I to be used in controlling undesirable vegetation will naturally depend on the condition of the vegetation, the degree of herbicidal activity desired, the formulation used, the mode of application, the climate, the season of the year and other variables. Recommendations as to precise amounts are therefore not possible. In general, however, application to the locus to be protected of from 0.5 to 10 pounds per acre of the herbicidal compounds used in this invention will be satisfactory. The preparation and some of the properties of the novel 1-(phenylazo)-2-imidazolidinones of the invention are illustrated by the following Examples. It should be understood however that the Examples given are for the purpose of illustration only and are not to be regarded as limiting the invention in any way. In the Examples below the structure of all the products prepared was confirmed by elemental, nuclear magnetic resonance, and infrared analyses.

EXAMPLE I

Preparation of 1-amino-2-imidazolidinone hydrochloride.
Method A

A 500 milliliter Paar hydrogenation bottle was charged with 4.0 grams of 10% palladium on powdered charcoal. 150 Milliliters of methanol was added under an inert atmosphere of nitrogen. After the palladium on charcoal was thoroughly wetted by the solvent, 9.45 grams of 1-benzylideneamino-2-imidazolidinone and 5 milliliters concentrated hydrochloric acid were added in that order. Hydrogenation was then carried out using molecular hydrogen at about 50 pounds per square inch and at room temperature. After hydrogen uptake ceased the palladium on powdered charcoal catalyst was filtered off and the methanolic solution was evaporated to dryness. The residue was washed with methylene chloride and then recrystallized from ethanol and ether to yield 3.7 grams of a white crystalline product melting at 176° to 177°C representing a 54% yield of 1-amino-2-imidazolidinone hydrochloride.
Method B A 500 milliliter Paar hydrogenation bottle was charged with 8.0 grams of 10% palladium on powdered charcoal. 250 Milliliters of methanol was added under an inert nitrogen atmosphere. After the palladium on charcoal was thoroughly wetted by the methanol, 22.4 grams of 1-benzylideneamino-2-imidazolidinone and 10 milliliters concentrated hydrochloric acid were added in that order. Hydrogenation was carried out using molecular hydrogen at 50 pounds per square inch and at room temperature. After the hydrogen uptake ceased, the catalyst was removed by filtration and the reaction mixture was poured into ether. A white crystalline solid precipitated and was collected by filtration yielding 12.4 grams of 1-amino-2-imidazolidinone hydrochloride, melting point 186° to 188°C, representing a 77% yield.

EXAMPLE II

To a flask containing 50 milliliters of glacial acetic acid was added 2.74 grams of 1-amino-2-imidazolidinone hydrochloride (prepared as in Example I), 1.64 grams sodium acetate, and 3.5 grams of alpha,alpha,alpha-trifluoro-3-nitrosotoluene. The reaction mixture was protected from moisture and light and stirred at room temperature for 4 days. When the reaction mixture was poured into 1 liter of water and stirred for 1 hour, a precipitate formed. The precipitate was removed by filtration and dried to give 3.6 grams of solid representing a 69% yield of 1-(alpha,alpha,alpha-trifluoro-3-tolylazo)-2-imidazolidinone.

In a similar experiment the crude reaction product was purified by column chromatography on silica gel with 4% by volume tetrahydrofuran in hexane. The chromatographed product was further purified by recrystallization from aqueous ethanol to give a white solid with melting point 181° to 182°C with gas evolution representing a 47% yield of 1-(alpha,alpha,alpha-trifluoro-3-tolylazo)-2-imidazolidinone.

EXAMPLES III TO VII

Using an experimental procedure similar to that of Examples I and II the compounds of Table I were prepared.

TABLE I 1-(Phenylazo)-2-imidazolidinones

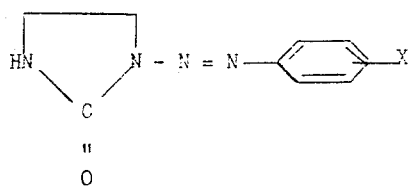

| Example Number | X | Yield, % | Melting Point, degrees C |
|---|---|---|---|
| III | H | 18 | 186–187[a] |
| IV | 2-Cl | 40 | 184–185 |
| V | 3-Cl | 25 | 189–190 |
| VI | 4-Cl | 51 | 203–204[b] |
| VII | 3-NO$_2$ | 45 | 214–215[a] |

[a] with gas evolution
[b] with decomposition

EXAMPLE VIII

The pre-emergence herbicidal activity of the compounds of the invention was evaluated by planting seeds of watergrass and cress in test tubes, nominally measuring 25×200 millimeters, containing soil treated with the test compounds at the rate of 1 and 0.1 milligrams of the active compound per tube. The planted soil was held under controlled conditions of temperature, moisture, and light for 13 to 14 days. The amount of germination was then noted and the effectiveness of the test compound was rated on the basis of a 0 to 9 scale, 0 rating indicating no effect, 9 indicating death of the seedlings or no germination.

The post-emergence activity of the compounds of this invention was evaluated by spraying 10-day old pigweed plants and 7-day old crabgrass plants to runoff with a liquid formulation of the test compound at the rates of 0.56 milliliters of a 0.5% solution designated Rate I in Table II and 0.62 milliliters of a 0.04% solution designated Rate II in Table II. The sprayed plants were held under controlled conditions for 10 to 11 days and the effect of the test chemical then evaluated visually, the results being rated on the 0 to 9 scale described above.

The results of the tests are summarized in Table II.

TABLE II

| | Herbicidal Activity | | | | | | | |
|---|---|---|---|---|---|---|---|---|
| | Pre-emergence | | | | Post-emergence | | | |
| | Watergrass | | Cress | | Crabgrass | | Pigweed | |
| Compound of Example | 1 mg/tube | 0.1 mg/tube | 1 mg/tube | 0.1 mg/tube | Rate I | Rate II | Rate I | Rate II |
| II | 9 | 9 | 9 | 9 | 9 | 8 | 9 | 7 |
| III | 9 | 2 | 9 | 8 | 0 | 0 | 0 | 0 |
| IV | 8 | 4 | 8 | 0 | 0 | 0 | 6 | 0 |
| V | 9 | 6 | 9 | 9 | 9 | 7 | 9 | 5 |
| VI | 4 | 0 | 8 | 0 | 7 | 3 | 8 | 2 |
| VII | 8 | 0 | 8 | 0 | 4 | 4 | 7 | 3 |

EXAMPLE IX

The pre-emergence herbicidal effect and the post-emergence herbicidal effect of some of the compounds of the invention were further tested on eight weeds. The results of these tests showing the amount of the compound needed to kill or to prevent germination of 95 per cent of the plants (LD$_{95}$) are given in Table III Pre-emergence and Table IV Post-emergence.

TABLE III

| | Pre-emergence Herbicide (Plant LD$_{95}$, lbs/acre) | | | | | | | |
|---|---|---|---|---|---|---|---|---|
| Compound of Example | Rye-Grass | Cheat-Grass | Crab-Grass | Water Grass | Pig-Weed | Mustard | Sow-thistle | Curly dock |
| II | 0.9 | 1.5 | 0.17 | 1.0 | <0.5[1] | 1.5 | 1.0 | 0.6 |
| III | 9.0 | 9.0 | 8.0 | >10[2] | 9.0 | 9.0 | 4.0 | >10 |
| V | 9.0 | >10 | 1.8 | 7.0 | 1.5 | 4.5 | 4.5 | 4.0 |

[1] The symbol < means "less than"
[2] The symbol > means "greater than"

TABLE IV

| Compound of Example | Pre-emergence Herbicide (Plant LD$_{95}$, lbs/acre) | | | | | | | |
| --- | --- | --- | --- | --- | --- | --- | --- | --- |
| | Rye-Grass | Cheat-Grass | Crab-Grass | Water Grass | Pig-Weed | Mus-tard | Sow-thistle | Curly dock |
| II | >5[1] | >5 | 0.4 | 2.0 | <0.5[2] | 1.7 | >5 | >5 |

[1] The symbol > means "greater than"
[2] The symbol < means "less than"

We claim as our invention:
1. A compound of the formula

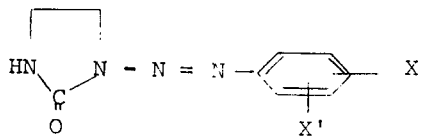

where X is independently hydrogen, fluorine, chlorine, bromine, nitro, or trifluoromethyl; and X' is hydrogen.

2. A compound according to claim 1 wherein X is trifluoromethyl.

3. A compound according to claim 1 wherein X is chlorine.

4. A compound according to claim 1 wherein X is nitro.

* * * * *